(12) United States Patent
Jiang et al.

(10) Patent No.: US 12,204,064 B2
(45) Date of Patent: Jan. 21, 2025

(54) SYSTEMS AND METHODS FOR NUCLEAR MAGNETIC RESONANCE (NMR) WELL LOGGING)

(71) Applicant: ConocoPhillips Company, Houston, TX (US)

(72) Inventors: Tianmin Jiang, Houston, TX (US); Ronald J. M. Bonnie, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 35 days.

(21) Appl. No.: 18/100,876

(22) Filed: Jan. 24, 2023

(65) Prior Publication Data

US 2023/0236337 A1  Jul. 27, 2023

Related U.S. Application Data

(60) Provisional application No. 63/302,391, filed on Jan. 24, 2022.

(51) Int. Cl.
 *G01V 3/32* (2006.01)
 *G01V 3/38* (2006.01)
(52) U.S. Cl.
 CPC . *G01V 3/32* (2013.01); *G01V 3/38* (2013.01)
(58) Field of Classification Search
 CPC .................................. G01V 3/32; G01V 3/38
 See application file for complete search history.

(56) References Cited

U.S. PATENT DOCUMENTS

| | | | |
|---|---|---|---|
| 10,031,255 B2 * | 7/2018 | Song | G01V 3/32 |
| 10,168,444 B2 * | 1/2019 | Jachmann | G01V 3/32 |
| 2004/0041562 A1 * | 3/2004 | Speier | G01V 3/32 |
| | | | 324/303 |

(Continued)

FOREIGN PATENT DOCUMENTS

EP      0886792 B1      5/2004

OTHER PUBLICATIONS

International Search Report and the Written Opinion of the International Searching Authority for International Application No. PCT/US2023/011417 dated Apr. 14, 2023 (15 pages).

(Continued)

*Primary Examiner* — Gregory H Curran
(74) *Attorney, Agent, or Firm* — Polsinelli PC

(57) ABSTRACT

Systems and method for nuclear magnetic resonance (NMR) well logging use an inversion pulse sequence with a Carr-Purcell-Meiboom-Gill (CPMG) pulse sequence to improve spin magnetization calculations. Improved Bloch equation-based calculations consider conditions where a longitudinal relaxation time and a transverse relaxation time of the hydrogen nuclei (e.g., of a subterranean hydrocarbon pool and/or water) are within an order of magnitude of pulse durations for the inversion pulse sequence and the CPMG pulse sequence. Accordingly, an NMR response to the inversion pulse sequence and the CPMG pulse can be detected and used to calculate one or more spin magnetization values with higher accuracy amplitudes. Reservoir characteristics are determined based on the one or more spin magnetization values. As such, improved well operations (e.g., selecting a drilling site, determining a drilling depth, and the like) can be performed.

20 Claims, 6 Drawing Sheets

(56) References Cited

U.S. PATENT DOCUMENTS

| | | |
|---|---|---|
| 2005/0272158 A1 | 12/2005 | Galford et al. |
| 2018/0120471 A1 | 5/2018 | Chen et al. |
| 2018/0217214 A1 | 8/2018 | Li et al. |
| 2018/0321169 A1 | 11/2018 | Shin et al. |
| 2019/0383757 A1 | 12/2019 | Anand et al. |
| 2020/0363352 A1 | 11/2020 | King et al. |

OTHER PUBLICATIONS

Klienberg et al., "Nuclear magnetic resonance imaging-technology for the 21st century", Oilfield Review, Jan. 1995, retrieved on [Mar. 28, 2023].

\* cited by examiner

SYSTEMS AND METHODS FOR NUCLEAR MAGNETIC RESONANCE (NMR) WELL LOGGING

CROSS-REFERENCE TO RELATED APPLICATIONS

The present application claims priority to U.S. Provisional Patent Application No. 63/302,391 filed on Jan. 24, 2022, which is incorporated by reference in its entirety herein.

TECHNICAL FIELD

Aspects of the present disclosure relate generally to systems and methods for well logging and more particularly to well logging using Nuclear Magnetic Resonance (NMR).

BACKGROUND

Reservoir characterization for oil and gas extraction operations often involves an understanding of in-situ fluid types and volumetrics. Some well logging techniques use Nuclear Magnetic Resonance (NMR) to determine an amount of hydrocarbons present and other reservoir characteristics at a particular location in the reservoir. NMR is a physical phenomenon in which hydrogen nuclei in a constant magnetic field are perturbed by a weak oscillating magnetic field and respond by producing a distinct electromagnetic signal. NMR logging relies on this phenomenon by creating a controlled magnetic field and sending one or more radio frequency (RF) pulses into the reservoir to magnetically polarize the hydrogen nuclei of the hydrocarbons and water, thus creating an NMR response within the controlled magnetic field. Due to principles of Brownian motion, the NMR response of the hydrogen nuclei can be proportional to a quantity of hydrogen nuclei present. Therefore, measuring the NMR response after the RF pulses can provide information about the hydrogen nuclei and corresponding reservoir characteristics. However, these techniques generally rely on various approximations to calculate spin magnetization values from the NMR data, which may result in inaccurate calculations when the approximations do not match real-world conditions.

It is with these observations in mind, among others, that various aspects of the present disclosure were conceived and developed.

SUMMARY

Implementations described and claimed herein address the foregoing problems by providing systems and methods for NMR well logging. In some examples, a method of well logging using nuclear magnetic resonance (NMR) comprises: positioning a radio frequency (RF) pulse transmitter in a well bore hole at a well site; generating a magnetic field in the well bore hole; generating, using the RF pulse transmitter, an inversion pulse sequence; generating, using the RF pulse transmitter, a Carr-Purcell-Meiboom-Gill (CPMG) pulse sequence including a plurality of P180 RF pulses, wherein the magnetic field, the inversion pulse sequence, and the CPMG pulse sequence cause an NMR response from a hydrocarbon pool within a transmission range of the RF pulse transmitter; determining one or more spin magnetization values of the hydrocarbon pool from the NMR response after a P180 RF pulse of the plurality of P180 RF pulses; and causing a well operation to be performed for the well site based on the one or more spin magnetization values.

Additionally, in some instances, the CPMG pulse sequence includes an initial P90 RF pulse followed by the plurality of P180 RF pulses. The one or more spin magnetization values can include a longitudinal relaxation time value and a transverse relaxation time value. Moreover, the longitudinal relaxation time value and the transverse relaxation time value can be within an order of magnitude of a first pulse duration of the initial P90 RF pulse and a second pulse duration of an initial P180 RF pulse of the inversion pulse sequence. By way of example, the inversion pulse sequence includes an initial P180 RF pulse followed by an inversion time between the initial P180 RF pulse and the initial P90 RF pulse. Additionally, determining the one or more spin magnetization values can be based on a Bloch equation with a resonance frequency offset being zero. Determining the one or more spin magnetization values can also be based on a Bloch equation with initial conditions of: an x-y plane spin magnetization being zero; and a z-axis spin magnetization being an equilibrium magnetization corresponding to the magnetic field.

In some scenarios, the method further comprises determining, for the hydrocarbon pool and based on the one or more spin magnetization values, one or more of: a fluid volume; a hydrocarbon pool geometry; a fluid viscosity; a pore geometry; or a fluid-pore interaction. Additionally, the well operation can include one or more of: selecting a drilling site; drilling to a particular drilling depth; performing well completion for the well bore hole; performing a shut-in procedure for the well bore hole; or performing an additional hydrocarbon pool characterization.

In some examples, a method of well logging using nuclear magnetic resonance (NMR) comprises: generating a magnetic field in a well bore hole at a well site; generating, using a radio frequency (RF) pulse transmitter in the well bore hole, an inversion pulse sequence; generating, using the RF pulse transmitter and subsequent to the inversion pulse sequence, a Carr-Purcell-Meiboom-Gill (CPMG) pulse sequence including an initial P90 RF pulse and a plurality of P180 RF pulses, wherein the magnetic field, the inversion pulse sequence, and the CPMG pulse sequence cause an NMR response from a hydrocarbon pool within a transmission range of the RF pulse transmitter; determining one or more spin magnetization values of the hydrocarbon pool from the NMR response, the one or more spin magnetization values including a longitudinal relaxation time value and a transverse relaxation time value; and causing a well operation to be performed for the well site based on the one or more spin magnetization values.

Furthermore, the one or more spin magnetization values can be determined after a P180 RF pulse of the plurality of P180 RF pulses. The longitudinal relaxation time value and the transverse relaxation time value can also be within an order of magnitude of a first pulse duration of the initial P90 RF pulse and a second pulse duration of an initial P180 RF pulse of the inversion pulse sequence. Additionally, determining the one or more spin magnetization values can be based on a Bloch equation with a resonance frequency offset being zero and/or with initial conditions of an x-y plane spin magnetization being zero; and a z-axis spin magnetization being an equilibrium magnetization corresponding to the magnetic field.

In some examples, a method of well logging using nuclear magnetic resonance (NMR) comprises: generating a homogenous magnetic field across a portion of a subterranean hydrocarbon pool at a well site; sending, using a radio frequency (RF) pulse transmitter, an inversion pulse sequence into the portion of the subterranean hydrocarbon pool; sending, using the RF pulse transmitter and subsequent to the inversion pulse sequence, a Carr-Purcell-Meiboom-Gill (CPMG) pulse sequence into the portion of the subterranean hydrocarbon pool, wherein the homogenous magnetic field, the inversion pulse sequence, and the CPMG pulse sequence cause an NMR response from the portion of the subterranean hydrocarbon pool; determining one or more spin magnetization values of the portion of the subterranean hydrocarbon pool from the NMR response, the one or more spin magnetization values including a longitudinal relaxation time value and a transverse relaxation time value; and causing a well operation to be performed for the well site based on the one or more spin magnetization values.

Additionally, the CPMG pulse sequence can include an initial P90 RF pulse and a plurality of P180 RF pulses. The inversion pulse sequence can include an initial P180 RF pulse followed by an inversion time between the initial P180 RF pulse and the initial P90 RF pulse. In some instances, the longitudinal relaxation time value and the transverse relaxation time value are within an order of magnitude of a first pulse duration of the initial P90 RF pulse and a second pulse duration of the initial P180 RF pulse. Moreover, determining the one or more spin magnetization values can be based on a Bloch equation with a resonance frequency offset being zero and/or with initial conditions of: an x-y plane spin magnetization being zero; and a z-axis spin magnetization being an equilibrium magnetization corresponding to the homogenous magnetic field.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

The foregoing summary, as well as the following detailed description, will be better understood when read in conjunction with the appended drawings. For the purpose of illustration, there is shown in the drawings certain embodiments of the disclosed subject matter. It should be understood, however, that the disclosed subject matter is not limited to the precise embodiments and features shown. The accompanying drawings, which are incorporated in and constitute a part of this specification, illustrate implementations of systems, methods, and apparatuses consistent with the disclosed subject matter and, together with the description, serve to explain advantages and principles consistent with the disclosed subject matter, in which.

DETAILED DESCRIPTION

Aspects of the present disclosure involve systems and methods for NMR well logging that result in improved accuracy for spin magnetization amplitude calculations. The techniques disclosed herein address amplitude accuracy issues that arise when the reservoir formation being characterized contains fluid components with relaxation times in the same order of magnitude as the RF pulse duration (e.g., shale and/or tight rock formations). In these scenarios, calculated echo amplitude values (e.g., corresponding to spin magnetization) using current theoretical calculations tend to result in an inaccurate amplitude and can fail to match measured data. The systems and methods discussed herein remedy these errors in the reservoir characterization, improving petrophysical interpretations from the calculations and well operations based on these interpretations.

In some examples, the fundamental Bloch equations on which current calculations are based are revisited and improved to include the relaxation effect on spin magnetization during a P180 RF pulse. An initial assumption that relaxation times of the hydrogen nuclei are at least an order of magnitude greater than the pulse duration is omitted and/or replaced with a consideration that the relaxation times are within an order of magnitude of the pulse duration. This provides a more accurate method to calculate the spin magnetizations that corrects the amplitude error created by the initial assumption, improving the accuracy of the NMR well logging system.

For instance, a modified inversion algorithm can be developed based on these techniques to correct the signal amplitude. Accordingly, unique signatures of formation fluids, such as gas, immobile hydrocarbon, producible oil, immobile and free water, can be detected at a higher level of granularity and/or accuracy. Furthermore, these techniques can provide better information regarding fluid and matrix properties, including fluid viscosity, pore geometry and fluid-pore interaction such that well operations can be improved (e.g., selecting a drilling site, determining a drilling depth, determining to perform well completion, performing a shut-in procedure for the well bore hole, and the like). Generally, the presently disclosed technology provides a modified inversion algorithm for data processing considering the relaxation effect on spin magnetization during 180° RF pulse, thereby providing more accurate NMR results from the measured data. Additional advantages will become apparent from the disclosure herein.

Figure 1:
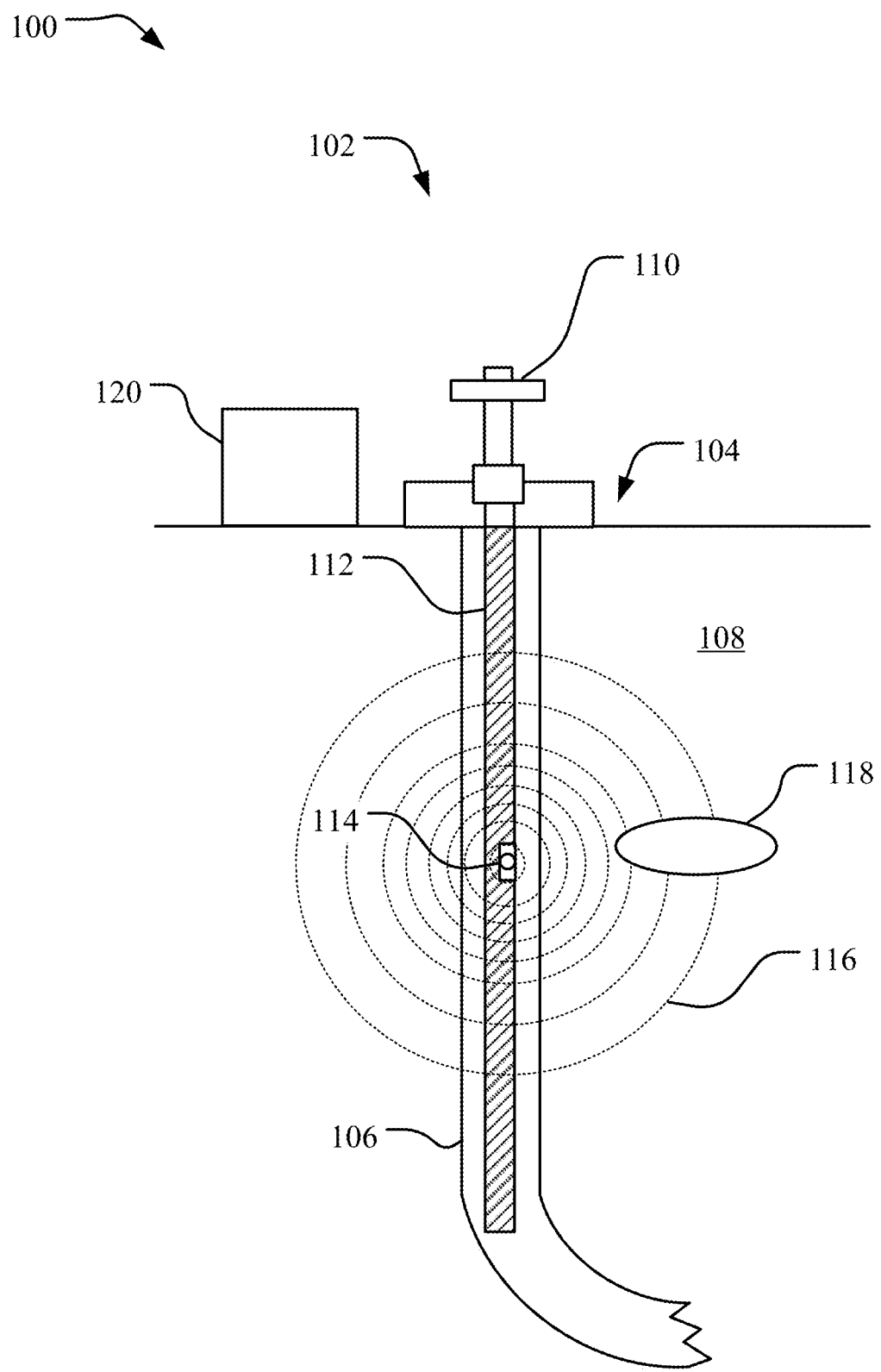
FIG. 1 depicts an example system for Nuclear Magnetic Resonance (NMR) well logging.

FIG. 1 illustrates an example system 100 for NMR well logging with amplitude correction at a well logging environment 102. The well logging environment 102 can be a well site 104 with a bore hole 106 into a subterranean feature 108 (e.g., an underground reservoir) for extracting oil or gas from the subterranean feature 108.

In some instances, the system 100 includes a wellhead assembly 110 connected to a string assembly 112 which is inserted into the bore hole 106. The string assembly 112 can include an NMR unit 114 with an electromagnet, an RF pulse transmitter, an antenna, and various sensors, hardware, and other computing device components to generate a constant and homogenous magnetic field, generate the one or more RF pulses 116 into the subterranean feature 108, and detect an NMR response. For instance, the RF pulses 116 can collide with one or more hydrocarbon pools 118 (e.g., and/or water pools) within a transmission range of the RF pulse transmitter. In response, the hydrocarbon pool 118 can transfer the increased nuclear spin energy into the surrounding environment as its precession reaches equilibrium, creating the NMR response including one or more relaxation times and/or echo amplitudes representing spin magnetization. The system 100 can also include one or more control center(s) 120 to house various equipment for controlling the NMR well logging techniques discussed herein.

Figure 2:
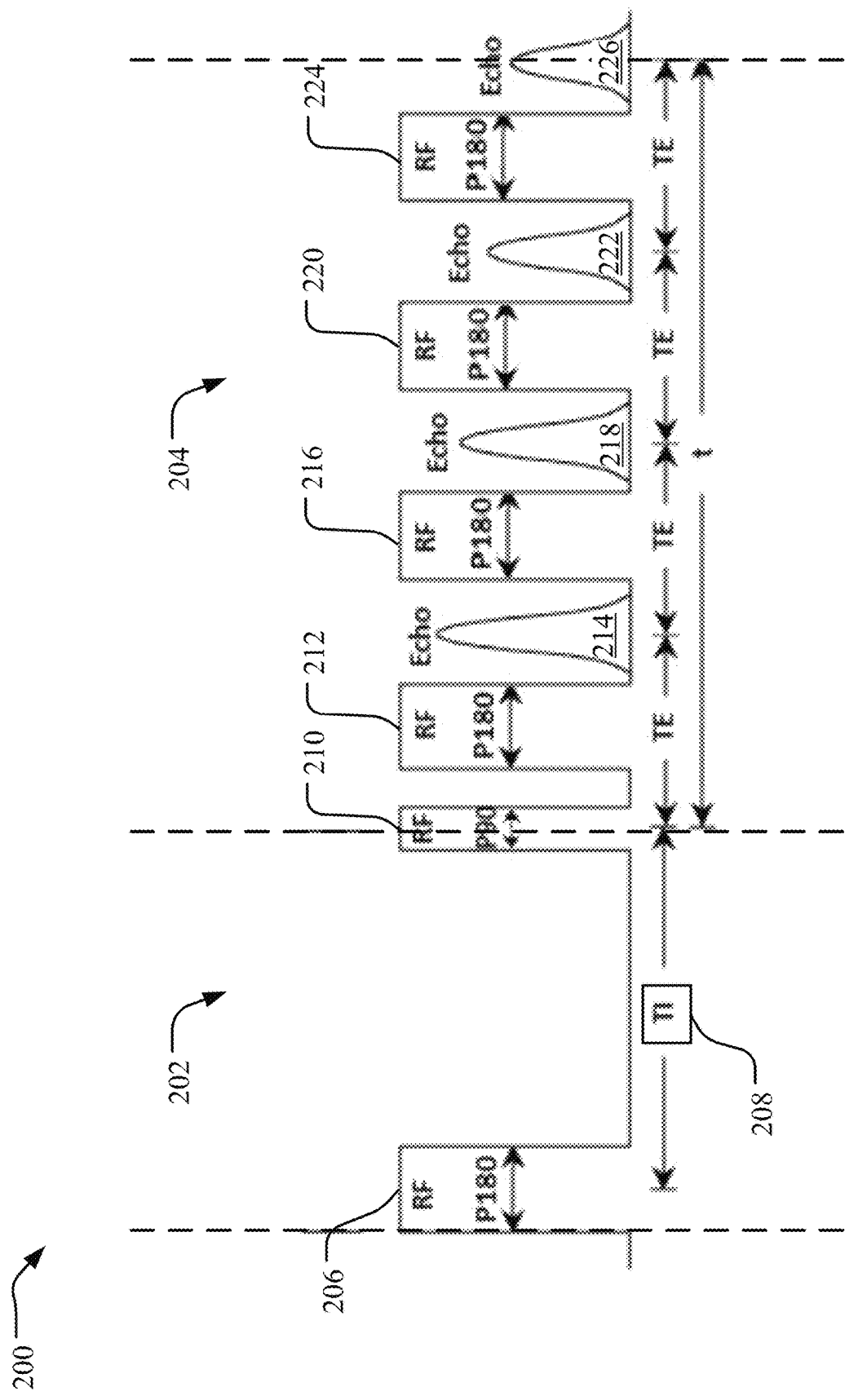
FIG. 2 depicts an example system for NMR well logging including an inversion pulse sequence and a Carr-Purcell-Meiboom-Gill pulse sequence, which can form at least a portion of the system depicted in FIG. 1.

FIG. 2 illustrates an example system 200 for NMR well logging with amplitude correction including an inversion pulse sequence 202 (e.g., an inversion recovery pulse sequence) and a Carr-Purcell-Meiboom-Gill (CPMG) pulse sequence 204, which can form at least a portion of the system depicted in FIG. 1. This NMR logging technique can provide simultaneous acquisition of relaxation time corresponding to the properties of the hydrogen pool 118 including a longitudinal relaxation time ($T_1$) in the longitudinal direction and a transverse relaxation time ($T_2$) in the transverse direction to create an intensity map of NMR $T_1$-$T_2$ relaxation time distributions.

For instance, the RF pulses 116 generated by the system 200 can include the inversion pulse sequence 202, which has an initial inversion pulse 206 followed by an Inversion time (TI) 208. The initial inversion pulse 206 can be a P180 pulse (e.g., an RF pulse with a 180°) pulse width). The TI 208 can then be followed by the CPMG pulse sequence 204. For instance, the CPMG pulse sequence 204 includes a P90 pulse 210 (e.g., an RF pulse with a 90° pulse width) followed by a first P180 echo pulse 212, a first echo period 214, a second P180 pulse 216, a second echo period 218, a third P180 pulse 220, a third echo period 222, a fourth P180 pulse 224, a fourth echo period 226, and can repeat in this manner for time (t).

In some scenarios, the $T_1$ and the $T_2$ values are in the millisecond range and are much longer than the duration of the initial inversion pulse 206, which can be in the microsecond range. In these scenarios, a spin echo magnetization amplitude at echo time t, generated by the system 200 using the inversion pulse sequence 202 followed by the CPMG pulse sequence 204, can be written as (equation 1):

$$M = M_0\left(1 - 2e^{-\frac{TI}{T_1}}\right)e^{-\frac{t}{T_2}}$$

Here, TI can be the inversion time in an IR-CPMG sequence (e.g., the inversion pulse sequence 202 followed by the CPMG pulse sequence 204) and $M_0$ can be the spin magnetization at equilibrium when a constant and homogeneous static magnetic field $B_0$ is applied to the hydrocarbon pool 118.

In scenarios where a measured sample has a distribution of $T_1$-$T_2$ instead of single values, equation 1 can be expressed as (equation 2):

$$M_{TI,t} = M_0 \sum_{i,j} f_{i,j}\left(1 - 2e^{-\frac{TI}{T_{1,i}}}\right)e^{-\frac{t}{T_{2,j}}}$$

Here, $f_{i,j}$ can be the fraction of the hydrogen nuclei spins with relaxation times $T_{1,i}$ and $T_{2,j}$.

In some instances the NMR response includes an echo amplitude which is measured at different echo times t using various 77. An inversion of measured echo amplitudes based on equation 2 can create a $T_1$-$T_2$ intensity map, which can be used to calculate fluid porosity and saturations.

In situations where the well logging environment 102 includes shale or tight rock samples (e.g., from an unconventional reservoir), the $T_1$ and $T_2$ values of clay bound water or very viscous hydrocarbon (e.g., bitumen) can be comparable to the pulse duration P180 and P90 (e.g., within an order of magnitude). In these situations, equations 1 and 2 may cause discrepancies between the measured data and theoretically calculated values. Because equations 1 and 2 are derived from Bloch equations with an approximation assuming $T_1$ or $T_2$ is much greater than P180, an amplitude correction for these situations can be generated by revisiting and re-assessing the Bloch equations. Generally, Bloch equations can be expressed as (equation 3):

$$\frac{d}{dt}\begin{pmatrix}M_x \\ M_y \\ M_z\end{pmatrix} = \begin{pmatrix}-\frac{1}{T_2} & \omega_0 - \omega & 0 \\ \omega - \omega_0 & -\frac{1}{T_2} & \omega_1 \\ 0 & -\omega_1 & -\frac{1}{T_2}\end{pmatrix}\begin{pmatrix}M_x \\ M_y \\ M_z\end{pmatrix} + \begin{pmatrix}0 \\ 0 \\ \frac{M_0}{T_1}\end{pmatrix}$$

Here, $M_x$, $M_y$, and $M_z$ can be the spin magnetization along x, y, and z axes. $\omega_0$ and $\omega_1$ can be the Larmor frequency of a static magnetic field $B_0$ and an RF transmit field $B_1$. $\omega$ can be the angular frequency of the RF transmit field $B_1$.

In scenarios where the resonance frequency offset $\omega - \omega_0$ is zero, $M_\perp$ can be defined as the spin magnetization in the x-y plane (e.g., the transvers plane), and equation 3 can be simplified as (equation 4):

$$\frac{d}{dt}\begin{pmatrix}M_\perp \\ M_z\end{pmatrix} = \begin{pmatrix}-\frac{1}{T_2} & \omega_1 \\ -\omega_1 & -\frac{1}{T_2}\end{pmatrix}\begin{pmatrix}M_\perp \\ M_z\end{pmatrix} + \begin{pmatrix}0 \\ \frac{M_0}{T_1}\end{pmatrix}$$

Furthermore, initial conditions can be:

$$\begin{pmatrix}M_\perp \\ M_z\end{pmatrix}_{t=0} = \begin{pmatrix}0 \\ M_0\end{pmatrix}$$

As such, a steady state solution (e.g., with $t \to \infty$) of equation 4 can be:

$$\begin{pmatrix}M_\perp \\ M_z\end{pmatrix}_{t \to \infty} = \begin{pmatrix}\frac{\omega_1 T_2}{1 + \omega_1^2 T_1 T_2}M_0 \\ \frac{1}{1 + \omega_1^2 T_1 T_2}M_0\end{pmatrix}$$

In some instances, equation 4 is a differential equation which can be numerically solved. A quality check (QC)

method can include comparing an amplitude of the first echo with the shortest TI to that with another echo with the longest TI. Using equation 1, at t=0 after a P180 pulse, $\exp(-t/T_2)=0$; $[1-2\exp(-TI/T_1)]\approx-1$ if $TI<T_1$; and $[1-2\exp(-TI/T_1)]\approx 1$ if $TI>>T_1$. As such a spin magnetization of the first echo with the shortest and longest TI values can have a close or nearly same amplitude to $M_0$ but with opposites signs, which can be an improvement over techniques that rely only on equations 1 and 2.

Figure 3:
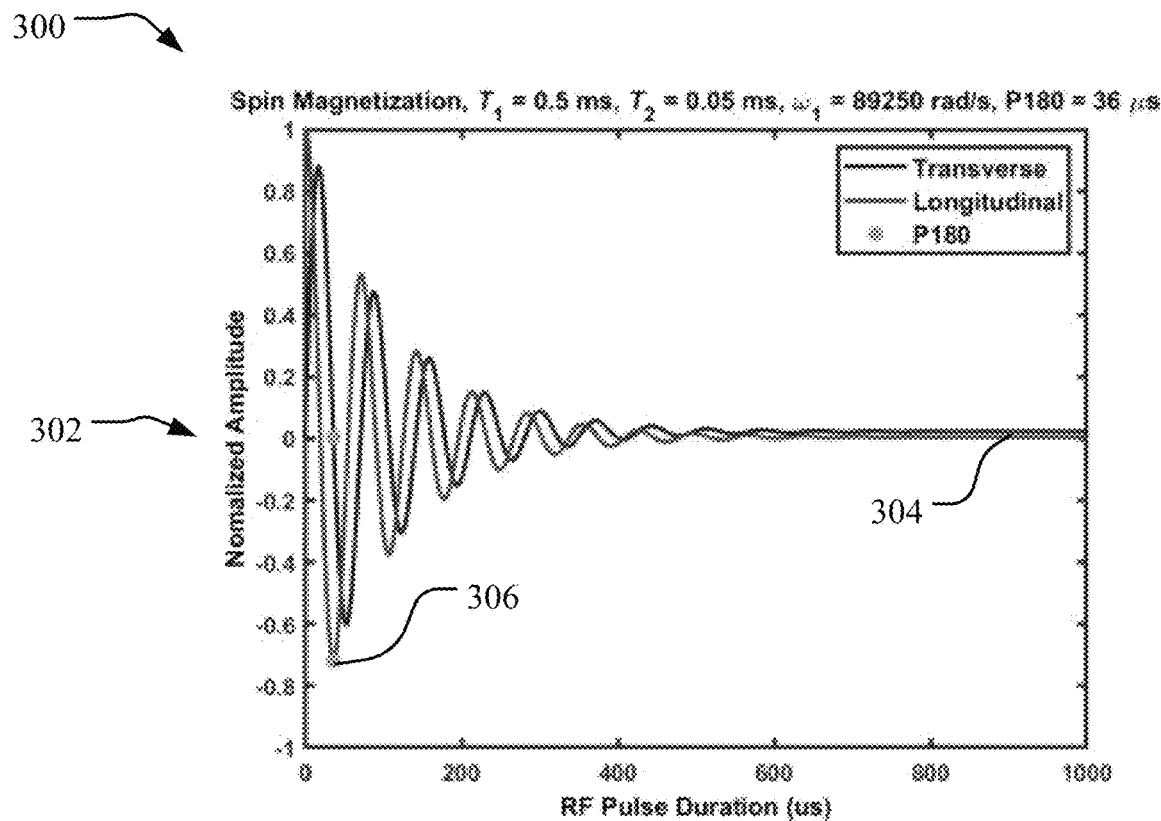
FIG. 3 depicts an example system for NMR well logging including one or more spin magnetizations, which can form at least a portion of the system depicted in FIG. 1.
Figure 3:
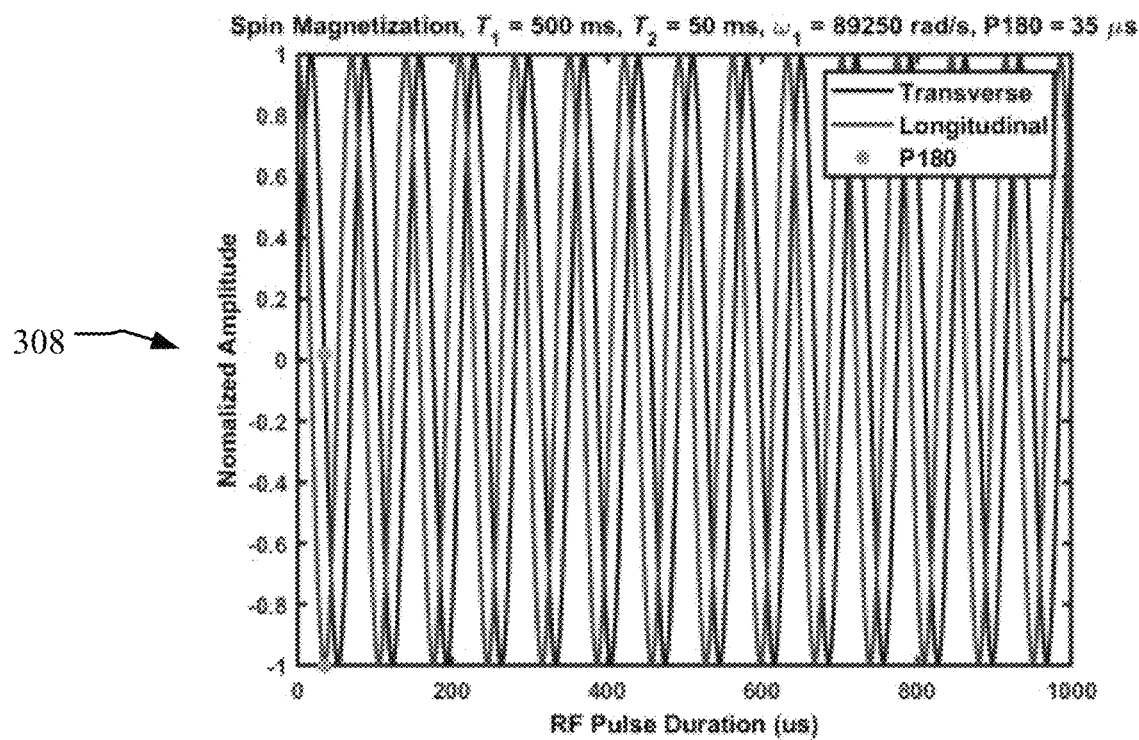

FIG. 3 illustrates an example system 300 for NMR well logging with amplitude correction including one or more spin magnetization (e.g., represented as numerical simulations), which can form at least a portion of the system depicted in FIG. 1.

For instance, FIG. 3 depicts numerical simulation results of spin magnetization using equation 4 as a function of P180 RF pulse duration with different $T_1$ and $T_2$ values. The system 300 can include a first spin magnetization 302 (e.g., represented as a numerical simulation) which can correspond to scenarios where $T_1$ and $T_2$ have values comparable to P180 (e.g., within an order of magnitude). A normalized amplitude of spin magnetization (e.g., $M/M_0$) in the first spin magnetization 302 can start oscillating with peak values rapidly attenuating to a steady-state value 304. At the end of the P180 RF pulse (e.g., when the spin longitudinal magnetization reaches the first valley value 306), a normalized signal amplitude can be less than an initial signal amplitude, corresponding to the relaxation effect on the spin magnetization.

In some instances, the system 300 can include a second spin magnetization 308 corresponding to scenarios where $T_1$ and $T_2$ are much larger than P180 (e.g., at least an order of magnitude greater). The normalized amplitude of spin magnetization (e.g., $M/M_0$) in the second spin magnetization 308 can keep oscillating with nearly no peak value attenuation. At the end of the P180 RF pulse, the normalized signal amplitude can be nearly the same as the initial signal amplitude, and with an opposite sign. Accordingly, in some instances, a relaxation effect is neglected during the P180 RF pulses, which can be consistent with the using equation 1.

Figure 4:
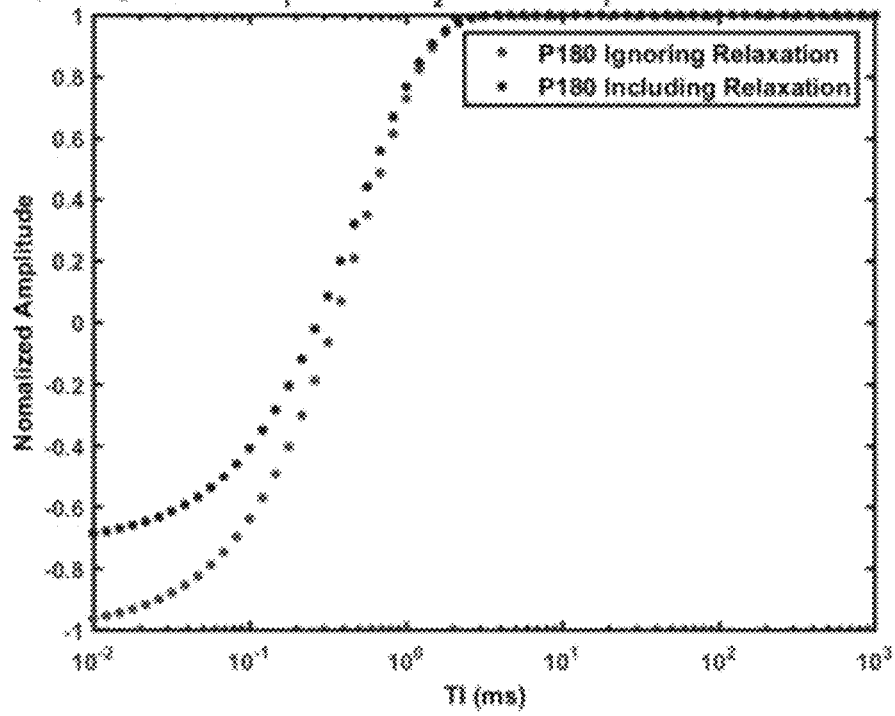
FIG. 4 depicts an example system for NMR well logging including one or more spin longitudinal magnetizations, which can form at least a portion of the system depicted in FIG. 1.
Figure 4:
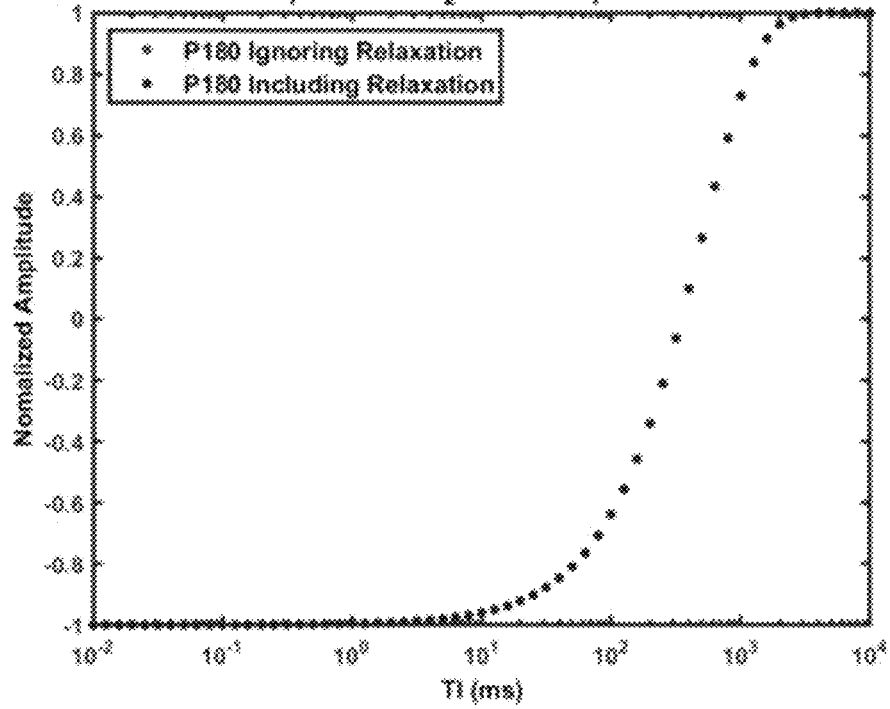

FIG. 4 illustrates an example system 400 for NMR well logging with amplitude correction including one or more spin longitudinal magnetization (e.g., represented as numerical simulations), which can form at least a portion of the system depicted in FIG. 1.

In some examples, after a P180 RF pulse, a spin magnetization amplitude at time t can be defined as (equation 5):

$$\begin{pmatrix} M_\perp \\ M_z \end{pmatrix}_t = \begin{pmatrix} M_{\perp,P180} e^{-\frac{t}{T_2}} \\ (M_{z,P180} - M_0) e^{-\frac{t}{T_2}} + M_0 \end{pmatrix}$$

Here, $M_{\perp,P180}$ and $M_{z,P180}$ can be the spin transverse and longitudinal magnetizations after the P180 RF pulse.

In some instances, the system 400 includes a spin longitudinal magnetization at t=TI+P180/2 (e.g., just before the P90 RF pulse) using equations 4 and 5 as the function of TI with different $T_1$ and $T_2$ values (e.g., represented as numerical simulation results). If a relaxation effect during the P180 RF pulse is ignored, equations 1 and 5 can be used in the calculation. Additionally or alternatively, equations 4 and 5 can be used for spin magnetization calculation in scenarios where the relaxation effect is included.

For instance, the system 400 can include a first spin magnetization 402 as a function of TI after the P180 RF pulse for scenarios where $T_1$ and $T_2$ are comparable to P180. In the first spin magnetization 402, the amplitudes show the difference between ignoring the relaxation effect (e.g., using equations 1 and 5) and including the relaxation effect (e.g., using equations 4 and 5) when TI is short. This difference can diminish as TI increases. Furthermore, when TI is considerably longer, the calculated amplitudes with or without considering the relaxation effect are nearly the same. If the relaxation effect is included, the calculated amplitude with the shortest TI is lower than that with the longest TI. This difference corresponds to the observed errors in amplitude calculations generated by using only equations 1 and 2, which suggests that the relaxation effect during the P180 RF pulse can be included when performing echo fitting calculations with measured data to correct the amplitude calculations.

Moreover, the system 400 can include a second spin magnetization 404 for scenarios were $T_1$ and $T_2$>>P180 RF pulse duration. In the second spin magnetization 404, the amplitudes can have nearly no difference with or without relaxation effect, regardless of the TI duration.

Generating and collecting NMR data to create a $T_1$-$T_2$ map using the techniques discussed herein can correct the amplitude calculations to improve the accuracy of the $T_1$-$T_2$ map. As such, the improved $T_1$-$T_2$ map can accurately represent unique signatures of formation fluids, such as oil, natural gas, immobile hydrocarbons, producible oil, immobile water, free water, and combinations thereof. The $T_1$-$T_2$ map can also provide a method to interpret fluid and matrix properties, including fluid viscosity, pore geometry and fluid-pore interaction. Various improved well operations can be performed in response to the operations performed by the systems 100-400 as discussed in greater detail below.

Figure 5:
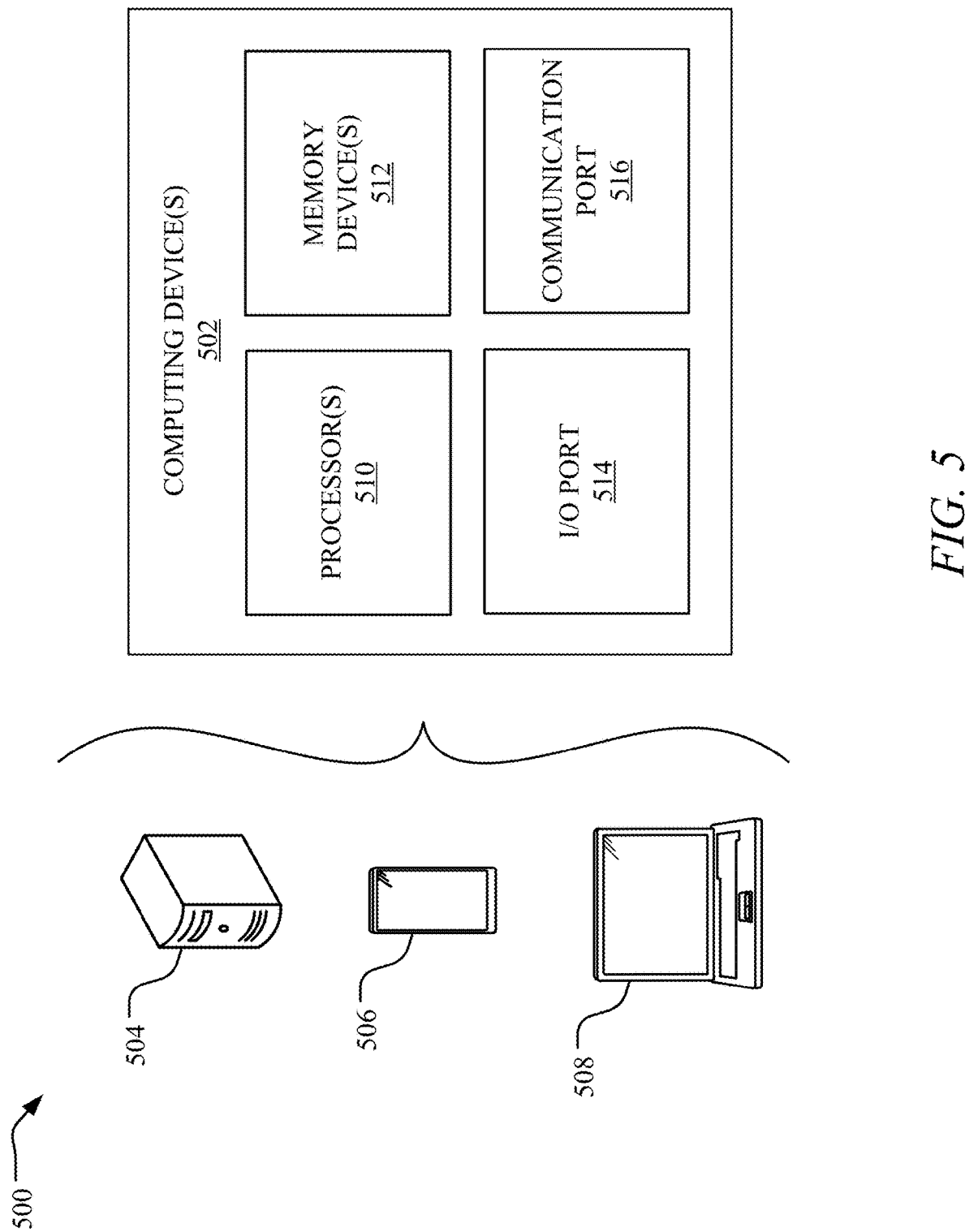
FIG. 5 illustrates an example system for NMR well logging using one or more computing devices, which can form at least a portion of the system depicted in FIG. 1.

FIG. 5 illustrates a system 500 for NMR well logging with amplitude correction using one or more computing devices 502, which can form at least a portion of the system 100 depicted in FIG. 1. In one implementation, the one or more computing device(s) 502 include one or more of a server 504, a mobile device 506, a laptop or desktop computing devices 508, and/or various other devices, which can be located at the well site 104 and/or remote from the well site 104 (e.g., at one or more control centers 120).

In some instances, the computing device(s) 502 includes a computer, a personal computer, a desktop computer, the laptop computer 508, a terminal, a workstation, a cellular device, a mobile phone, the mobile device 506, a smart mobile device a tablet, a wearable device (e.g., a smart watch, smart glasses, a smart epidermal device, etc.) a multimedia console, a television, an Internet-of-Things (IoT) device, a smart home device, a medical device, a virtual reality (VR) or augmented reality (AR) device, and/or the like. The computing device 502 can be the server 504, which may be one single server, a plurality of servers with each such server being a physical server or a virtual machine, or a collection of both physical servers and virtual machines. In another implementation, a cloud hosts one or more components of the system.

The computing device(s) 502 may be integrated with, form a part of, or otherwise be associated with the systems 100-400. For instance, the computing device(s) 502 can be at the control center 120 and/or with well logging personnel to perform the operations of the system 100-400. For instance, the computing device 502 may be a computing system capable of executing a computer program product to execute a computer process. An NMR logging application can be stored and executed at the computing device 502 (e.g., as one or more software components). Data and program files may be input to the computing device 502 (e.g., corresponding to the inversion pulse sequence 202, the CPMG pulse sequence 204, and equations 1-5) which can read the files, execute the programs, collect the data resulting corresponding to the NMR response, and determine the various reservoir properties from the NMR response. Moreover, the computing device 502 can send an instruction to a well planning system, a well drilling system, and/or a well completion system to perform the well operation or other operational action in response to the reservoir properties determined from the NMR response.

Some of the elements of the computing device 502 can include one or more hardware processors 510, one or more memory devices 512, and/or one or more ports, such as input/output (IO) port(s) 514 and communication port(s) 516. Additionally, other elements that will be recognized by those skilled in the art may be included in the computing device 502 but are not explicitly depicted in FIG. 5 or discussed further herein. Various elements of the computing device 502 may communicate with one another by way of the communication port(s) 516 and/or one or more communication buses, point-to-point communication paths, or other communication means.

The processor 510 may include, for example, a central processing unit (CPU), a microprocessor, a microcontroller, a digital signal processor (DSP), and/or one or more internal levels of cache. There may be one or more processors 510, such that the processor 510 comprises a single central-processing unit, or a plurality of processing units capable of executing instructions and performing operations in parallel with each other, commonly referred to as a parallel processing environment.

The computing device 502 may be stand-alone computer, a distributed computer, or any other type of computer, such as one or more external computers made available via a cloud computing architecture. The presently described technology is optionally implemented in software stored on data storage device(s) such as the memory device(s) 512, and/or communicated via one or more of the ports 514 and 516, thereby transforming the computing device 502 in FIG. 5 to a special purpose machine for implementing the operations described herein. Moreover, the unconventional arrangement of components of the computing devices 502 with the NMR unit 114 for generating the RF pulses 116 and collecting NMR response data improves the field of technology of NMR well logging.

The one or more memory device(s) 512 may include any non-volatile data storage device capable of storing data generated or employed within the computing device 502, such as computer-executable instructions for performing a computer process, which may include instructions of both application programs and an operating system (OS) that manages the various components of the computing device 502. The memory device(s) 512 may include, without limitation, magnetic disk drives, optical disk drives, solid state drives (SSDs), flash drives, and the like. The memory device(s) 512 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory device(s) 512 may include volatile memory (e.g., dynamic random-access memory (DRAM), static random-access memory (SRAM), etc.) and/or non-volatile memory (e.g., read-only memory (ROM), flash memory, etc.).

Computer program products containing mechanisms to effectuate the systems and methods in accordance with the presently described technology may reside in the memory device(s) 512 which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

In some implementations, the computing device 502 includes one or more ports, such as the I/O port 514 and the communication port 516, for communicating with other computing, network, or vehicle devices. It will be appreciated that the I/O port 514 and the communication port 516 may be combined or separate and that more or fewer ports may be included in the computing device 502.

The I/O port 514 may be connected to an I/O device, or other device, by which information is input to or output from the computing device 502. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing device 502 via the I/O port 514. Similarly, the output devices may convert electrical signals received from the computing device 502 via the I/O port 514 into signals that may be sensed as output by a human, such as sound, light, and/or touch. The input device may be an alphanumeric input device, including alphanumeric and other keys for communicating information and/or command selections to the processor 510 via the I/O port 514. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

In one implementation, the communication port 516 is connected to a network and the computing device 502 may receive network data useful in executing the methods and systems set out herein as well as transmitting information and network configuration changes determined thereby. Stated differently, the communication port 516 connects the computing device 502 to one or more communication interface devices configured to transmit and/or receive information between the computing device(s) 502 and other computing device(s) 502 (e.g., located at the well site 104 and/or remotely from the well site 104) by way of one or more wired or wireless communication networks or connections. Examples of such networks or connections include, without limitation, Universal Serial Bus (USB), Ethernet, Wi-Fi, Bluetooth®, Near Field Communication (NFC), and so on. One or more such communication interface devices may be utilized via the communication port 516 to communicate one or more other machines, either directly over a point-to-point communication path, over a wide area network (WAN) (e.g., the Internet), over a local area network (LAN), over a cellular network (e.g., third generation (3G), fourth generation (4G), Long-Term Evolution (LTE), fifth generation (5G), etc.) or over another communication means. Further, the communication port 516 may communicate with an antenna or other link for electromagnetic signal transmission and/or reception.

The system 500 set forth in FIG. 5 includes but one possible example of the computing device(s) 502 that may employ or be configured in accordance with aspects of the present disclosure. It will be appreciated that other non-transitory tangible computer-readable storage media storing computer-executable instructions for implementing the presently disclosed technology on a computing system may be utilized. In the present disclosure, the methods disclosed may be implemented as sets of instructions or software readable by the computing device 502.

Figure 6:
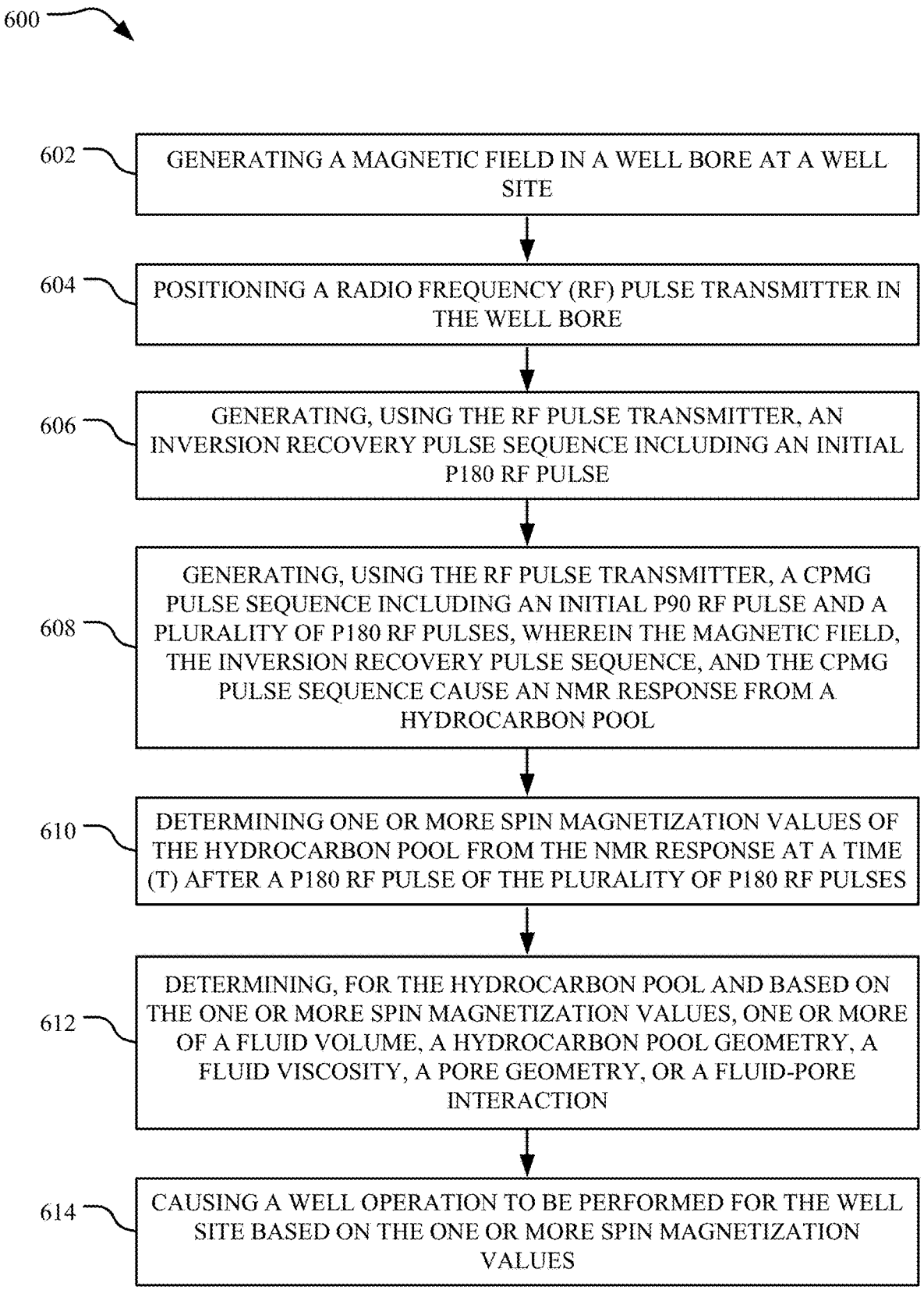
FIG. 6 illustrates an example method for NMR well logging, which can be performed by the system depicted in FIG. 1.

FIG. 6 illustrates an example method 600 for NMR well logging which can be performed by the system 100 depicted in FIG. 1.

At operation 602, the method 600 can generate a magnetic field in a well bore at a well site. At operation 604, the method 600 can position an RF pulse transmitter in the well bore. At operation 606, the method 600 can generate, using the RF pulse transmitter, an inversion pulse sequence including an initial P180 RF pulse. At operation 608, the method 600 can generate, using the RF pulse transmitter, a CPMG pulse sequence including an initial P90 RF pulse and a plurality of P180 RF pulses, wherein the magnetic field, the inversion pulse sequence, and the CPMG pulse sequence cause an NMR response from a hydrocarbon pool. At operation 610, the method 600 can determine one or more spin magnetization values of the hydrocarbon pool from the NMR response at a time (t) after a P180 RF pulse of the plurality of P180 RF pulses. At operation 612, the method 600 can determine, for the hydrocarbon pool and based on the one or more spin magnetization values, one or more of a fluid volume, a hydrocarbon pool geometry, a fluid viscosity, a pore geometry, or a fluid-pore interaction. For instance, operation 612 can include generating a $T_1$-$T_2$ map based on multiple spin magnetization values (e.g., a plurality of longitudinal relaxation time value and a plurality of transverse relaxation time value). At operation 614, the method 600 can cause a well operation to be performed for the well site based on the one or more spin magnetization values. For instance, operation 614 can include selecting a drilling site, drilling to a particular drilling depth, performing well completion for the well bore hole, performing a shut-in procedure for the well bore hole, or performing an additional hydrocarbon pool characterization (e.g., using an additional inversion pulse sequence and/or an additional CPMG pulse sequence) based on the one or more spin magnetization values. Accordingly, techniques performed by the systems discussed herein for NMR well logging can be integrated into a variety of practical applications by providing more accurate hydrocarbon characteristic information to improve the efficiency and accuracy of well operation procedures.

It is to be understood that the specific order or hierarchy of operations in the method depicted in FIG. 6 and throughout this disclosure are instances of example approaches and can be rearranged while remaining within the disclosed subject matter. For instance, any of the operations depicted in FIG. 6 and throughout this disclosure may be omitted, repeated, performed in parallel, performed in a different order, and/or combined with any other of the operations depicted in FIG. 6 or throughout this disclosure.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method of well logging, the method comprising:
positioning a radio frequency (RF) pulse transmitter in a well bore hole at a well site;
generating a magnetic field in the well bore hole;
generating, using the RF pulse transmitter, an inversion pulse sequence;
generating, using the RF pulse transmitter, a Carr-Purcell-Meiboom-Gill (CPMG) pulse sequence including a plurality of P180 RF pulses, wherein the magnetic field, the inversion pulse sequence, and the CPMG pulse sequence cause a nuclear magnetic resonance (NMR) response from a hydrocarbon pool within a transmission range of the RF pulse transmitter;
determining one or more spin magnetization values of the hydrocarbon pool from the NMR response after a P180 RF pulse of the plurality of P180 RF pulses; and
causing a well operation to be performed for the well site based on the one or more spin magnetization values.

2. The method of claim 1, wherein the CPMG pulse sequence includes an initial P90 RF pulse followed by the plurality of P180 RF pulses.

3. The method of claim 2, wherein the one or more spin magnetization values include a longitudinal relaxation time value and a transverse relaxation time value.

4. The method of claim 3, wherein the longitudinal relaxation time value and the transverse relaxation time value are within an order of magnitude of a first pulse duration of the initial P90 RF pulse and a second pulse duration of an initial P180 RF pulse of the inversion pulse sequence.

5. The method of claim 2, wherein the inversion pulse sequence includes an initial P180 RF pulse followed by an inversion time between the initial P180 RF pulse and the initial P90 RF pulse.

6. The method of claim 1, wherein determining the one or more spin magnetization values is based on a Bloch equation with a resonance frequency offset being zero.

7. The method of claim 1, wherein determining the one or more spin magnetization values is based on a Bloch equation with initial conditions of:
an x-y plane spin magnetization being zero; and
a z-axis spin magnetization being an equilibrium magnetization corresponding to the magnetic field.

8. The method of claim 1, further comprising determining, for the hydrocarbon pool and based on the one or more spin magnetization values, at least one of:
a fluid volume;
a hydrocarbon pool geometry;
a fluid viscosity;
a pore geometry; or
a fluid-pore interaction.

9. The method of claim 8, wherein the well operation includes at least one of:
selecting a drilling site;
drilling to a particular drilling depth;
performing well completion for the well bore hole;
performing a shut-in procedure for the well bore hole; or
performing an additional hydrocarbon pool characterization.

10. A method of well logging, the method comprising:
generating a magnetic field in a well bore hole at a well site;
generating, using a radio frequency (RF) pulse transmitter in the well bore hole, an inversion pulse sequence;
generating, using the RF pulse transmitter and subsequent to the inversion pulse sequence, a Carr-Purcell-Meiboom-Gill (CPMG) pulse sequence including an initial P90 RF pulse and a plurality of P180 RF pulses, wherein the magnetic field, the inversion pulse sequence, and the CPMG pulse sequence cause a nuclear magnetic resonance (NMR) response from a hydrocarbon pool within a transmission range of the RF pulse transmitter;
determining one or more spin magnetization values of the hydrocarbon pool from the NMR response, the one or more spin magnetization values including a longitudinal relaxation time value and a transverse relaxation time value; and
causing a well operation to be performed for the well site based on the one or more spin magnetization values.

11. The method of claim 10, wherein the one or more spin magnetization values are determined after a P180 RF pulse of the plurality of P180 RF pulses.

12. The method of claim 10, wherein the longitudinal relaxation time value and the transverse relaxation time value are within an order of magnitude of a first pulse duration of the initial P90 RF pulse and a second pulse duration of an initial P180 RF pulse of the inversion pulse sequence.

13. The method of claim 10, wherein determining the one or more spin magnetization values is based on a Bloch equation with a resonance frequency offset being zero.

14. The method of claim 10, wherein determining the one or more spin magnetization values is based on a Bloch equation with initial conditions of:
an x-y plane spin magnetization being zero; and
a z-axis spin magnetization being an equilibrium magnetization corresponding to the magnetic field.

15. A method of well logging, the method comprising:
generating a homogenous magnetic field across a portion of a subterranean hydrocarbon pool at a well site;
sending, using a radio frequency (RF) pulse transmitter, an inversion pulse sequence into the portion of the subterranean hydrocarbon pool;
sending, using the RF pulse transmitter and subsequent to the inversion pulse sequence, a Carr-Purcell-Meiboom-Gill (CPMG) pulse sequence into the portion of the subterranean hydrocarbon pool, wherein the homogenous magnetic field, the inversion pulse sequence, and the CPMG pulse sequence cause a nuclear magnetic resonance (NMR) response from the portion of the subterranean hydrocarbon pool;
determining one or more spin magnetization values of the portion of the subterranean hydrocarbon pool from the NMR response, the one or more spin magnetization values including a longitudinal relaxation time value and a transverse relaxation time value; and
causing a well operation to be performed for the well site based on the one or more spin magnetization values.

16. The method of claim 15, wherein the CPMG pulse sequence includes an initial P90 RF pulse and a plurality of P180 RF pulses.

17. The method of claim 16, wherein the inversion pulse sequence includes an initial P180 RF pulse followed by an inversion time between the initial P180 RF pulse and the initial P90 RF pulse.

18. The method of claim 17, wherein the longitudinal relaxation time value and the transverse relaxation time value are within an order of magnitude of a first pulse duration of the initial P90 RF pulse and a second pulse duration of the initial P180 RF pulse.

19. The method of claim 18, wherein determining the one or more spin magnetization values is based on a Bloch equation with a resonance frequency offset being zero.

20. The method of claim 19, wherein the Bloch equation has initial conditions of:
an x-y plane spin magnetization being zero; and
a z-axis spin magnetization being an equilibrium magnetization corresponding to the homogenous magnetic field.

* * * * *